United States Patent
Kim et al.

(10) Patent No.: US 8,719,860 B2
(45) Date of Patent: May 6, 2014

(54) AUGMENTED BROADCASTING STREAM TRANSMISSION DEVICE AND METHOD, AND AUGMENTED BROADCASTING SERVICE PROVIDING DEVICE AND METHOD

(71) Applicant: Electronics and Telecommunications Research Institute, Daejeon (KR)

(72) Inventors: Soon Choul Kim, Daejeon-si (KR); Jeoung Lak Ha, Daejeon-si (KR); Jung Hak Kim, Daejeon-si (KR); Seung Chul Kim, Daejeon-si (KR); Bum Suk Choi, Daejeon-si (KR); Young Ho Jeong, Daejeon-si (KR); Jin Woo Hong, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/689,891

(22) Filed: Nov. 30, 2012

(65) Prior Publication Data
US 2013/0254798 A1 Sep. 26, 2013

(30) Foreign Application Priority Data
Mar. 22, 2012 (KR) .................. 10-2012-0029201

(51) Int. Cl.
- H04N 7/10 (2006.01)
- H04N 7/025 (2006.01)
- G06F 3/00 (2006.01)
- G06F 13/00 (2006.01)
- H04N 5/445 (2011.01)

(52) U.S. Cl.
USPC ................ 725/32; 725/40; 725/42; 725/51; 725/60; 725/61

(58) Field of Classification Search
None
See application file for complete search history.

(56) References Cited

U.S. PATENT DOCUMENTS

| | | | |
|---|---|---|---|
| 7,548,565 B2 | 6/2009 | Sull et al. | |
| 7,853,969 B2 * | 12/2010 | Smith et al. | 725/22 |
| 2003/0115612 A1 * | 6/2003 | Mao et al. | 725/136 |
| 2008/0046919 A1 * | 2/2008 | Carmi et al. | 725/32 |
| 2009/0235311 A1 * | 9/2009 | Michel et al. | 725/40 |
| 2009/0259941 A1 * | 10/2009 | Kennedy, Jr. | 715/719 |
| 2011/0063415 A1 * | 3/2011 | Gefen et al. | 348/43 |
| 2012/0066711 A1 * | 3/2012 | Evans et al. | 725/32 |

FOREIGN PATENT DOCUMENTS

| | | |
|---|---|---|
| KR | 1020110040639 A | 4/2011 |
| KR | 1020110049099 A | 5/2011 |
| KR | 1020110066298 A | 6/2011 |

* cited by examiner

Primary Examiner — Brian T Pendleton
Assistant Examiner — Alexander Gee
(74) Attorney, Agent, or Firm — William Park & Associates Patent Ltd

(57) ABSTRACT

An augmented broadcasting stream transmission device and method and an augmented broadcasting service providing device and method capable of ensuring that augmented broadcasting metadata arrive at a receive terminal in a time more rapid as compared to a corresponding video frame by a predetermined time are provided.

16 Claims, 11 Drawing Sheets

AUGMENTED BROADCASTING STREAM TRANSMISSION DEVICE AND METHOD, AND AUGMENTED BROADCASTING SERVICE PROVIDING DEVICE AND METHOD

CROSS-REFERENCE TO RELATED APPLICATIONS

This application claims the benefit of priority of Korean Patent Application No. 10-2012-0029201 filed on Mar. 22, 2012, all of which are incorporated by reference in their entirety herein.

BACKGROUND OF THE INVENTION

1. Field of the Invention

The present invention relates to a transmission device and method and an augmented broadcasting service providing device and method, and more particularly, to an augmented broadcasting stream transmission device and method for providing an augmented broadcasting service, and an augmented broadcasting service providing device and method based on the same.

2. Related Art

Augmented broadcasting is a new application service concept of receiving each of a broadcasting program including videos/audios/data transmitted by a broadcasting station and an augmented content (2D/3D content) through a broadcasting network or the Internet in a terminal (for example, a smart TV, a set-top box, or the like) and outputting the received broadcasting program or the augmented content as one broadcasting program on a TV screen. That is, the augmented broadcasting is a technology allowing a receiving side terminal to overlay the augmented contents with each other in order to escape from a one-sided broadcasting program of a broadcasting network and provide increased immersion and reality to a user through content synchronization and image synthesis, unlike an existing scheme of synthesizing the broadcasting program and the augmented content with each other and transmitting the synthesized broadcasting program and augmented content as one broadcasting program in the broadcasting station.

Recently, position based augmented reality services using a camera in a smart phone, a global positioning system (GPS), a broadband access, a tilt sensor, a digital compass, or the like, have been introduced. This position based augmented reality using a sensor has been evolved into image recognition based augmented reality to be applied to various fields such as an education, a game, an advertisement, a sport, a sightseeing, and the like. Since the image recognition based augmented reality in which an object captured by a camera is directly recognized or indirectly recognized through a marker and then overlapped with augmented reality information may be applied even to the interior of a room, the possibility that the image recognition based augmented reality will be used as a new business tool has increased.

Particularly, in a scheme in which the augmented reality technology is applied to broadcasting, as seen from an example such as a virtual advertisement, a virtual graphic, image, or moving picture is synthesized with a real image photographed through a camera using a high performance system to thereby be reconfigured and transmitted as one new image, the transmitted image is received in a TV terminal in the same scheme as a scheme of receiving a general broadcasting image, and all viewers viewing corresponding broadcasting view the same image. Therefore, augmented reality information in the broadcasting has been mainly applied to a sport field and has been provided in a form in which it is synthesized with a broadcasting image based on operation information of the camera, which limits a selection right of the viewer for the augmented reality information. In addition, it is difficult to provide various bidirectional data services based on the augmented reality information.

Research into a technology of representing an augmented image by view's selection in the broadcasting in accordance with technology issues such as the augmented reality, the virtual advertisement, and the like, and the trend toward a smart terminal has started. This augmented reality concept is expanded to a broadcasting domain to define a new field called augmented broadcasting. That is, the augmented broadcasting is a broadcasting service for naturally harmonizing a broadcasting program and an augmented broadcasting content with each other to increase reality and liveness of the TV viewer and providing selective service reception beyond an existing scheme in which the TV viewer one-sidedly receives a broadcasting program transmitted by the broadcasting station. In order to provide this new broadcasting application service, a new broadcasting equipment configuration and a transmission procedure are required. Therefore, it is required to provide a service by a specialized transmission method.

RELATED ART DOCUMENT

Patent Document (Patent Document 1) Korean Patent Laid-Open Publication No. KR10-2011-0040639 (Entitled "Synchronized and Interactive Apparatus between Real World and Virtual World", Electronics and Telecommunications Research Institute, published on Apr. 20, 2011)

SUMMARY OF THE INVENTION

The present invention provides an augmented broadcasting stream transmission device and method and an augmented broadcasting service providing device and method capable of ensuring that augmented broadcasting metadata including information on a position at which an augmented content is put arrive at a receive terminal in a time more rapid as compared to a corresponding video frame by a predetermined time so that the receive terminal may realize synchronization between a specific image scene or frame of a video broadcasting program and a video frame of the augmented content in real time.

The present invention also provides an augmented broadcasting stream transmission device and method and an augmented broadcasting service providing device and method capable of solving inefficiency of data repetitive transmission used in existing data broadcasting, minimizing a service waiting time by receiving augmented broadcasting metadata in real time even though entry into an augmented broadcasting service channel at any time, and efficiently transmitting and receiving an augmented broadcasting stream in consideration of a storage space of a receive terminal according to massive data transmission of the augmented broadcasting metadata.

In an aspect, an augmented broadcasting stream transmission device of generating an augmented broadcasting stream to transmit the augmented broadcasting stream to a receiving side in order to provide an augmented broadcasting service is provided. The augmented broadcasting stream transmission device includes: an image stream generating unit generating an image stream based on an image source of the augmented broadcasting service; a metadata stream generating unit generating metadata related to an augmented content of the augmented broadcasting service based on the image source to generate a metadata stream; and a re-multiplexing unit receiving the image stream and the metadata stream as inputs and multiplexing the image stream and the metadata stream to generate and transmit the augmented broadcasting stream, wherein the metadata stream generating unit calculates a sending time s in which metadata n corresponding to an image frame k of the image source are transmitted based on a presentation time t in which the image frame k is transmitted and generates the metadata stream so that the metadata n are transmitted in the sending time s.

The sending time s may be calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content.

The sending time s may be a value obtained by subtracting the sum of the broadcasting arriving time, the network arriving time, and the traffic transfer time from the presentation time t.

The metadata stream generating unit may generate a metadata transmission information list based on the calculated sending time and the metadata, and the metadata stream may include the metadata transmission information list.

The metadata stream generating unit may include: an augmented broadcasting authoring server generating the metadata based on the image source; and a metadata streamer receiving the metadata to generate the metadata stream.

The augmented broadcasting authoring server may receive the image source as an input and edit information on an area at which the augmented content for the augmented broadcasting content service is put in an individual image frame section and an attribute of the augmented content to generate the metadata.

The metadata streamer may include: a receiving unit receiving the metadata from the augmented broadcasting authoring server; a parsing unit parsing the metadata to calculate the sending time and generating a metadata transmission information list based on the sending time and the metadata; a system clock referencing unit synchronizing a system time of the metadata streamer with the image stream generating unit based on a system clock meaning a reference time for determining an image output time of the image source and the sending time of the metadata of the metadata streamer; a judging unit monitoring the system clock and searching the transmission information list for each time section and then judging whether the sending time corresponds to a transmission range; and an encoding unit encoding metadata corresponding to the transmission range to generate the metadata stream.

The augmented broadcasting stream transmission device may further include a program service information protocol (PSIP) server transmitting signaling information for the augmented broadcasting service, wherein the re-multiplexing unit receives the image stream, the metadata stream, and the signaling information as inputs and multiplexes the image stream, the metadata stream, and the signaling information.

In another aspect, an augmented broadcasting stream transmission method of generating an augmented broadcasting stream to transmit the augmented broadcasting stream to a receiving side in order to provide an augmented broadcasting service is provided. The augmented broadcasting stream transmission method includes: an image stream generating step of generating an image stream based on an image source of the augmented broadcasting service; a metadata stream generating step of generating metadata related to an augmented content of the augmented broadcasting service based on the image source to generate a metadata stream; and a re-multiplexing step of receiving the image stream and the metadata stream as inputs and multiplexing the image stream and the metadata stream to generate and transmit the augmented broadcasting stream, wherein the metadata stream generating step includes a step of calculating a sending time in which metadata n corresponding to an image frame k of the image source are transmitted based on a presentation time t in which the image frame k is transmitted and generating the metadata stream so that the metadata n are transmitted in the sending time.

The sending time may be calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content.

The sending time may be a value obtained by subtracting the sum of the broadcasting arriving time, the network arriving time, and the traffic transfer time from the presentation time t.

The metadata stream generating step may include a step of generating a metadata transmission information list based on the calculated sending time and the metadata, and the metadata stream may include the metadata transmission information list.

The metadata stream generating step may further include: a metadata generating step of generating the metadata based on the image source; and a stream generating step of receiving the metadata to generate the metadata stream.

The metadata generating step may include a step of receiving the image source as an input and editing information on an area at which the augmented content for the augmented broadcasting content service is put in an individual image frame section and an attribute of the augmented content to generate the metadata.

The stream generating step may include: a step of receiving the metadata; a step of parsing the metadata to calculate the sending time and generating a metadata transmission information list based on the sending time and the metadata; a system clock referencing step of synchronizing a system time of a metadata streamer with an image stream generating unit based on a system clock meaning a reference time for determining an image output time of the image source and the sending time of the metadata of the metadata streamer; a judging step of monitoring the system clock and searching the transmission information list for each time section and then judging whether the sending time corresponds to a transmission range; and an encoding step of encoding metadata corresponding to the transmission range to generate the metadata stream.

The augmented broadcasting stream transmission method may further include a step of transmitting signaling information for the augmented broadcasting service, wherein the re-multiplexing step includes a step of receiving the image stream, the metadata stream, and the signaling information as inputs and multiplexing the image stream, the metadata stream, and the signaling information.

In still another aspect, an augmented broadcasting service providing device of receiving an augmented broadcasting stream to provide an augmented broadcasting service is provided. The augmented broadcasting service providing device includes: a demultiplexing unit calculating a sending time in which metadata n corresponding to an image frame k of an image source are transmitted based on a presentation time t in which the image frame k is transmitted and receiving and demultiplexing the augmented broadcasting stream including information related to the calculated sending time to generate an image stream and a metadata stream; an image source generating unit decoding the image stream to generate the image source; a metadata interpreting unit interpreting the metadata stream to request and receive an augmented content; a synchronizing unit performing media synchronization on the image source and the augmented content based on the presentation time t included in the information related to the sending time; and a content outputting unit outputting the synchronized content.

The augmented broadcasting service providing device of may further include a storing buffer storing the received metadata or the received augmented content therein until the received metadata or the received augmented content are synchronized with each other.

In still another aspect, an augmented broadcasting service providing method of receiving an augmented broadcasting stream to provide an augmented broadcasting service is provided. The augmented broadcasting service providing method includes: a demultiplexing step of calculating a sending time in which metadata n corresponding to an image frame k of an image source are transmitted based on a presentation time t in which the image frame k is transmitted and receiving and demultiplexing the augmented broadcasting stream including information related to the calculated sending time to generate an image stream and a metadata stream; an image source generating step of generating the image source based on the image stream; a metadata interpreting step of interpreting the metadata stream to request and receive an augmented content; a synchronizing step of performing media synchronization on the image source and the augmented content based on the presentation time t included in the information related to the sending time; and a content outputting step of outputting the synchronized content.

The augmented broadcasting service providing device may further include a step of providing a storing buffer storing the received metadata or the received augmented content therein until the received metadata or the received augmented content are synchronized with each other.

DESCRIPTION OF EXEMPLARY EMBODIMENTS

Figure 1:
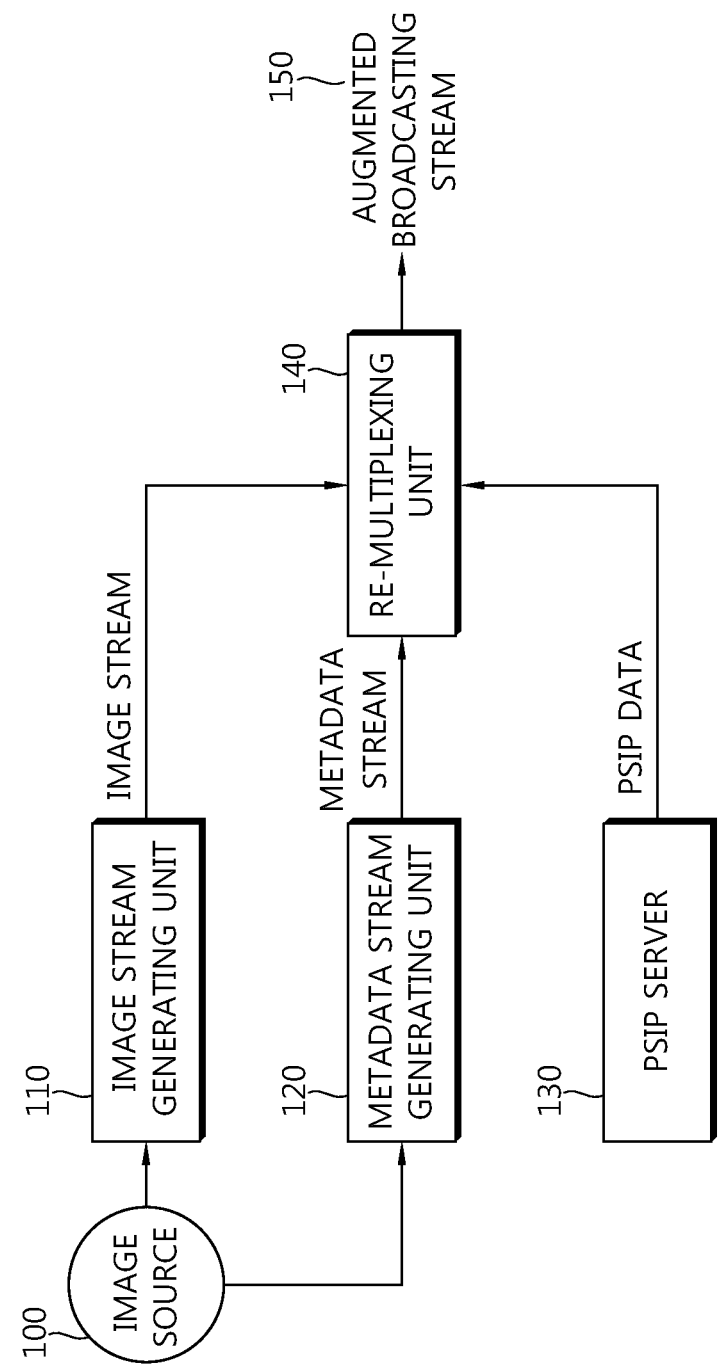
FIG. 1 is a block diagram schematically showing an augmented broadcasting stream transmission device according to an exemplary embodiment of the present invention.

Since the present invention may be variously modified and have several exemplary embodiments, specific exemplary embodiments will be shown in the accompanying drawings and be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

Augmented Broadcasting Stream Transmission Device

FIG. 1 is a block diagram schematically showing an augmented broadcasting stream transmission device according to an exemplary embodiment of the present invention. As shown in FIG. 1, the augmented broadcasting stream transmission device according to the exemplary embodiment of the present invention may include an image stream generating unit 110, a metadata stream generating unit 120, a program service information protocol (PSIP) server 130, and a re-multiplexing unit 140.

Referring to FIG. 1, the image stream generating unit 110 receives an image source 100 as an input and encodes the image source 100 to generate an image stream. The image stream generating unit 100 may be an audio/video (AV) encoder. According to the exemplary embodiment of the present invention, the image stream generating unit 110 may be an MPEG-2 TS encoder or a device having the same configuration as the MPEG-2 TS encoder in some cases. That is, the image source 100 input from an AV player or a camera is encoded into MPEG-2 TS and then transmitted as the image stream. The transmitted image stream may be transmitted to the re-multiplexing unit 140 to thereby be multiplexed with a metadata stream.

The metadata stream generating unit 120 receives the image source 100 as an input, generates metadata for augmented broadcasting services corresponding to each image frame of the image source 100, and streams the metadata to generate a metadata stream. First, the metadata stream generating unit 120 may edit information on an area at which an augmented content is put in a corresponding video frame section and an attribute of the augmented content and then generate augmented broadcasting metadata based on the image source 100. In addition, the metadata generating unit 120 may transmit the generated metadata in real time or in non-real time. The real time and the non-real time are distinguished from each other as follows. The case of transmitting the metadata simultaneously with generating the metadata may be called the real time, and the case of storing the previously edited or generated metadata before transmitting the metadata may be called the non-real time. The real time transmission scheme is a scheme of generating the metadata through a metadata authoring tool (not shown) simultaneously with transmitting the broadcasting. The metadata includes various attribute information. A presentation time among the attribute information in the metadata, which is a frame output time of a video image, includes a relative time from a video image start time to a current time.

In both of the two cases, that is, the real time the non-real time, the metadata stream generating unit 120 encodes the augmented broadcasting metadata in a discussed encoding scheme and tables only related information to store the tabled information in a memory. The encoded metadata may be fragmented in individual transmission unit. Then, the encoded metadata are output according to a sending time. The sending time of the metadata has the very important meaning in view of media synchronization. The sending time of the metadata selects and transmits only metadata included in a predetermined time interval based on the presentation time and a system clock (the system clock which is a reference time for determining an image output time of the image source 100 and a sending time of the metadata of the metadata streamer (not shown) of the metadata stream generating unit 120 is used for time synchronization between two components).

The PSIP server 130 transmits signaling information for the augmented broadcasting service.

The re-multiplexing unit 150 receives the image stream encoded through the image stream generating unit 110, the metadata stream encoded through the metadata generating unit 120, and PSIP data as inputs and multiplexes them into a single stream to transmit the multiplexed single stream through a broadcasting network. According to the exemplary embodiment of the present invention, the single stream may be an MPEG-2 TS stream.

Figure 2:
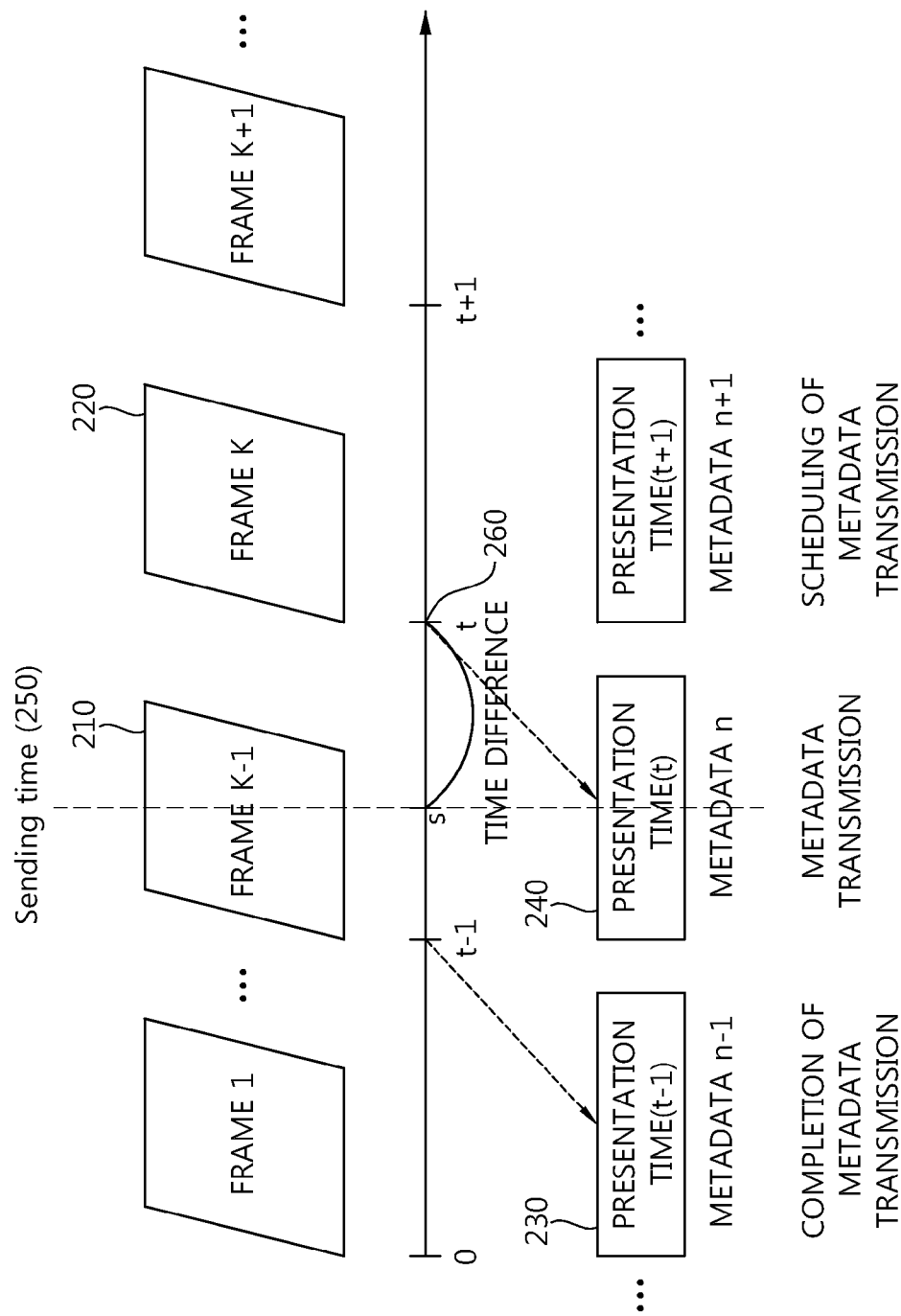
FIG. 2 is a conceptual diagram describing a sending time of metadata according to an output of image frames according to the exemplary embodiment of the present invention.

FIG. 2 is a conceptual diagram describing a sending time of metadata according to an output of image frames according to the exemplary embodiment of the present invention. As shown in FIG. 2, the sending time 250 of the metadata may be calculated based on the presentation time of each image frame of the image source.

Referring to FIG. 2, an upper portion of a horizontal time axis indicates a sequential output flow of video image frames, and a lower portion thereof indicates an output flow of augmented broadcasting metadata. That is, the image frames are sequentially transmitted in a sequence of an image frame 1, an image frame 2, . . . , an image frame k−1 210, an image frame k 220, and an image frame k+1, and the metadata are transmitted in a sequence of metadata 1, metadata 2, . . . , metadata n−1 230, metadata n 240, and metadata n+1 while having a relationship corresponding to the image frames.

For example, the image frame k 220 to be presented in a specific time t 250 and the metadata n 240 corresponding to the image frame k are time-synchronized with each other in a receive terminal via the presentation time t. The presentation time t is a lapse time of a video image in a process in which the augmented broadcasting metadata authoring tool generates/edits the augmented area. This time is inserted into a time field in corresponding metadata.

When a specific time s 250 is reached during output of a remaining frame k−1 210 through the augmented broadcasting stream transmission device according to the exemplary embodiment of the present invention, transmission of the metadata n−1 230 has been already completed through the metadata streamer (not shown) and transmission of the metadata n 240 is prepared. That is, the metadata n 240, which are data required at the time of synchronization with an image frame of a time t 260, are transmitted before a corresponding frame. That is, a time difference is present between a sending time of the image frame k 220 and a sending time of the metadata n 240 corresponding to the image frame k, and the metadata n 240 are transmitted before the image frame k 220 by this time difference.

As described above, according to the exemplary embodiment of the present invention, when comparing the sending times of the metadata and the image frame corresponding thereto with each other, a time difference may be present, and the metadata may be transmitted in advance by the time difference to arrive at the terminal. Since the receive terminal should interpret information on an area at which an augmented content for the image frame k 220 is put in a corresponding video frame section and a related attribute through the corresponding metadata n 240 in order to output the augmented content based on a time t 260, the metadata n 230 should arrive at the terminal in at least a time more rapid than the time t 260 by the time difference. Therefore, in the case in which the metadata n 240 does not arrive the receive terminal before the time t 250, it may not be ensured that the augmented broadcasting service of a corresponding image frame is provided.

Figure 3:
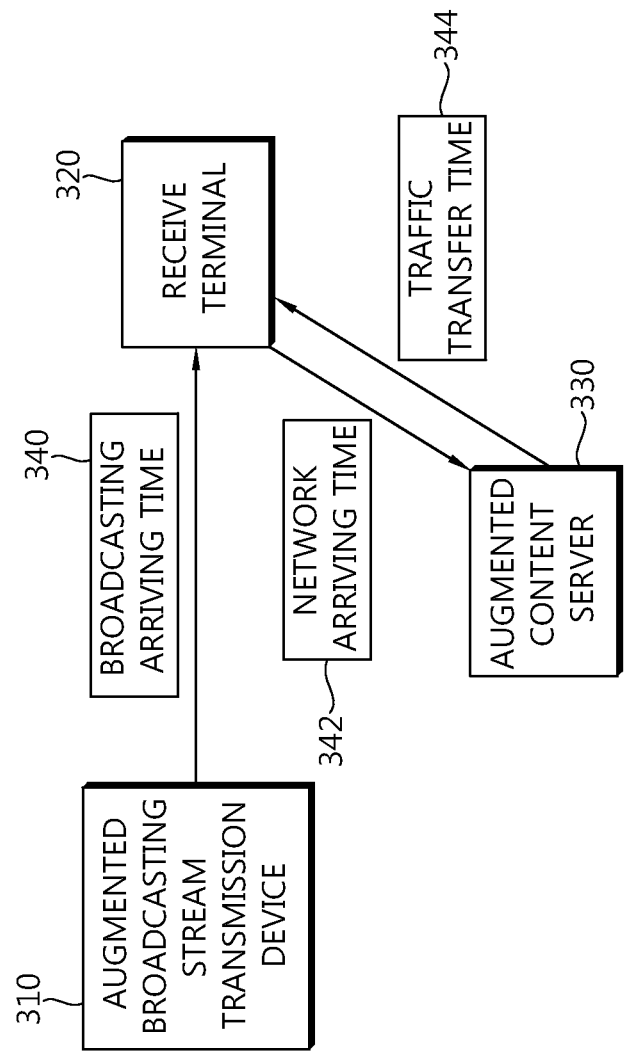
FIG. 3 is a conceptual diagram describing elements to be considered at the time of transmission of the metadata in the augmented broadcasting stream transmission device according to the exemplary embodiment of the present invention.

FIG. 3 is a conceptual diagram describing elements to be considered at the time of transmission of the metadata in the augmented broadcasting stream transmission device according to the exemplary embodiment of the present invention. As shown in FIG. 3, the sending time may be calculated based on the presentation time (not shown), a broadcasting arriving time 340, a network securing time 342, and a traffic transfer time 344.

Referring to FIG. 3, as described above, the metadata n 240 of FIG. 2 needs to be transmitted in a sending time more rapid than that of the image frame k 220 by a predetermined time. This sending time s 250 may be calculated based on the broadcasting arriving time 340 required to transfer the image frame from the augmented broadcasting stream transmission device 310 to the receive terminal 320 through the broadcasting network, a time required to secure an augmented content from an augmented content server 330 through a communication network (for example, the Internet network), that is, the network arriving time 342, and the traffic transfer time 344 according to a type (for example, a 3D object, an image, a text, a moving picture, or the like) of augmented content. Here, the traffic transfer time 344 has a weight provided according to a type of augmented content. For example, a weight of five seconds is provided to a 3D object and a weight of two seconds is provided to a 2D image. That is, an appropriate weight may be applied to each type of augmented content to thereby be used to calculate the sending time.

Figure 4:
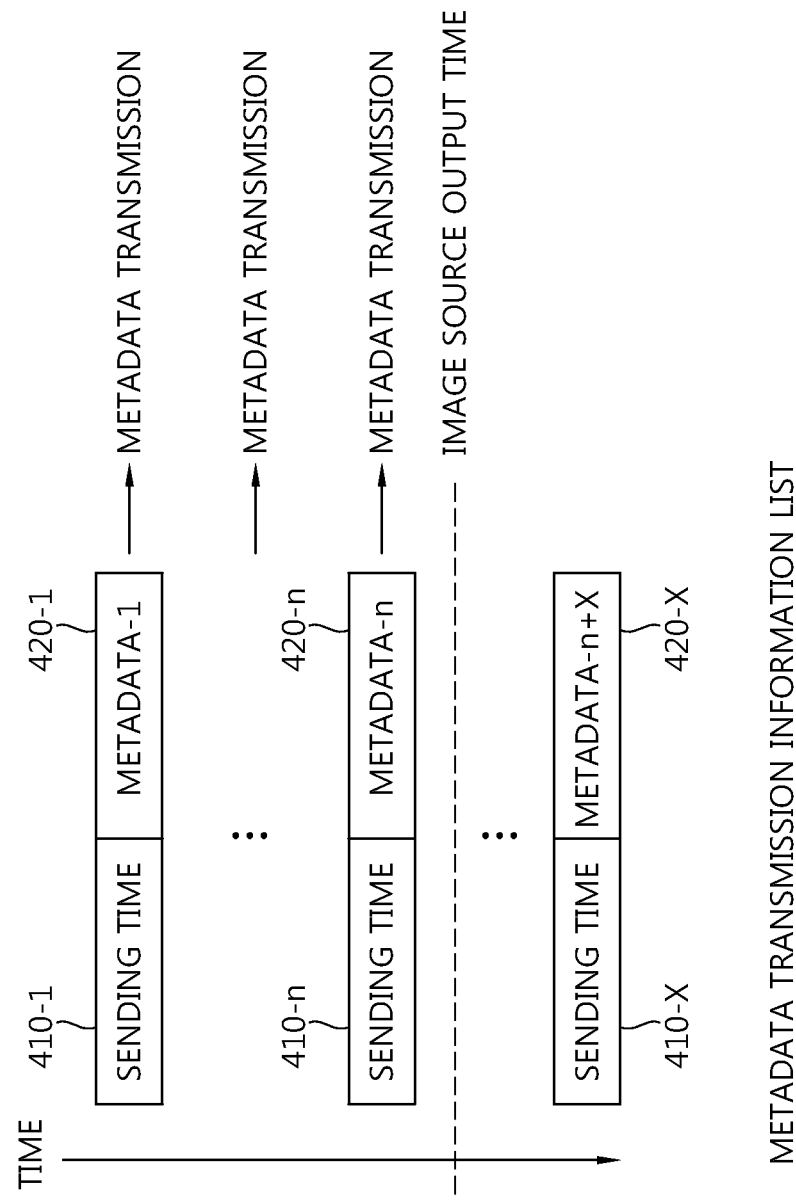
FIG. 4 is a diagram showing an information configuration for transmitting the metadata in a streamer in consideration of the metadata transmitted for synchronization of a receive terminal and a transfer time of an augmented content in the augmented broadcasting stream transmission device according to the exemplary embodiment of the present invention.

FIG. 4 is a diagram showing an information configuration for transmitting the metadata in a streamer in consideration of the metadata transmitted for synchronization of a receive terminal and a transfer time of an augmented content in the augmented broadcasting stream transmission device according to the exemplary embodiment of the present invention. As shown in FIG. 4, a metadata transmission information list includes a sending time 410 and metadata 420.

Referring to FIG. 4, a metadata streamer (not shown) parses metadata generated in an augmented broadcasting authoring server (not shown) to configure the metadata transmission information list. A sending time field is calculated based on a presentation time in the metadata and then inserted into the transmission information list. Here, the sending time may be calculated through the following operation.

Sending Time 250=Presentation Time−(Broadcasting Arriving Time 340+Network Arriving Time 342+Traffic Transfer Time 344)

In addition, a metadata identification value is configured in the transmission information list. When a corresponding sending time is reached, the metadata is searched through the identification value and then encoded. An image source output time related time line moves with the passage of time, and the sending times field values of the metadata transmission information list are compared with each other according to the movement of the time line to determine the transmission of the metadata.

According to the exemplary embodiment shown in FIG. 4, when the sending times 410 are compared with the image source output time, all of the metadata having a sending time 410-1 to a sending time 410-*n* corresponding to sending times before the image source output time have been transmitted and the transmission of the metadata having sending times after the sending time 410-*n* have not been yet determined. Therefore, the sending times calculated through the above-mentioned scheme according to the image source output time are compared with the image source output time to determine the transmission range, that is, the transmission of corresponding metadata before the image source output time and transmit the determined metadata.

Figure 5:
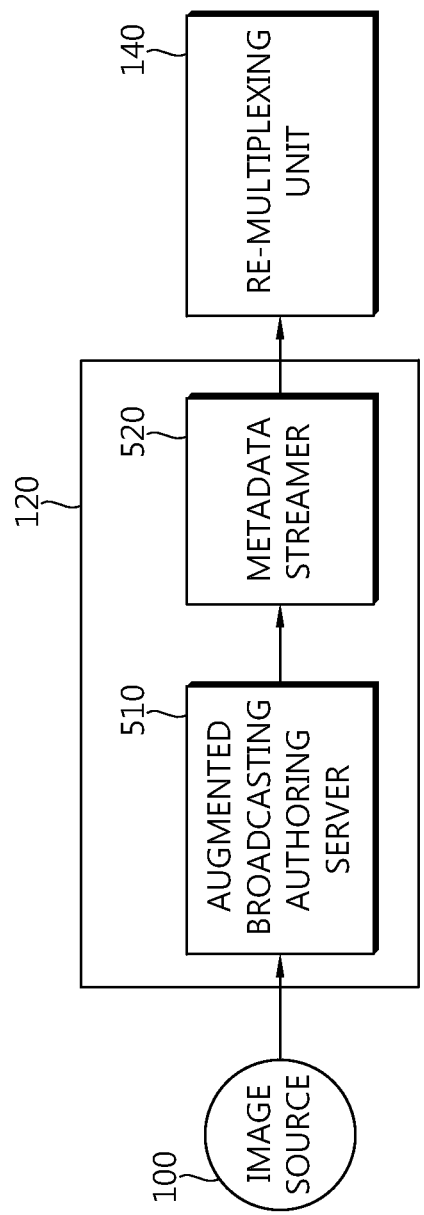
FIG. 5 is a detailed block diagram showing a metadata stream generating unit of the augmented broadcasting stream transmission device according to the exemplary embodiment of the present invention in detail.

FIG. 5 is a detailed block diagram showing a metadata stream generating unit 120 of the augmented broadcasting stream transmission device according to the exemplary embodiment of the present invention in detail. Referring to FIG. 5, the metadata stream generating unit 120 according to the exemplary embodiment of the present invention may include an augmented broadcasting authoring server 510 and a metadata streamer 520.

Referring to FIG. 5, the augmented broadcasting authoring server 510 receives the image source 100 as an input and edits the information on an area at which an augmented content is put in a corresponding video frame section and an attribute of the augmented content and then generates augmented broadcasting metadata. Then, the augmented broadcasting authoring server 510 transmits the generated metadata to the metadata streamer 520.

The metadata streamer 520 receives the augmented broadcasting metadata from the augmented broadcasting authoring server 510 in real time or non-real time. As described above, particularly in the case of receiving the metadata in non-real time, the metadata is stored in the streamer 520 before transmission. The metadata streamer 520 parses the received metadata to fragment the parsed metadata in an individual transmission unit, thereby easily organizing sending time calculation and transmission determination. Then, the metadata streamer 520 calculates the sending time based on the presentation time, the network arriving time, and the traffic transfer time for each metadata, encodes the metadata corresponding to a transmission range to generate the metadata stream, and transmits the metadata stream to the re-multiplexing unit 140. The transmitted metadata stream is multiplexed with the image stream (not shown) and the PSIP data, such that the augmented broadcasting stream is generated. The generated augmented broadcasting stream is transmitted to the receive terminal.

Figure 6:
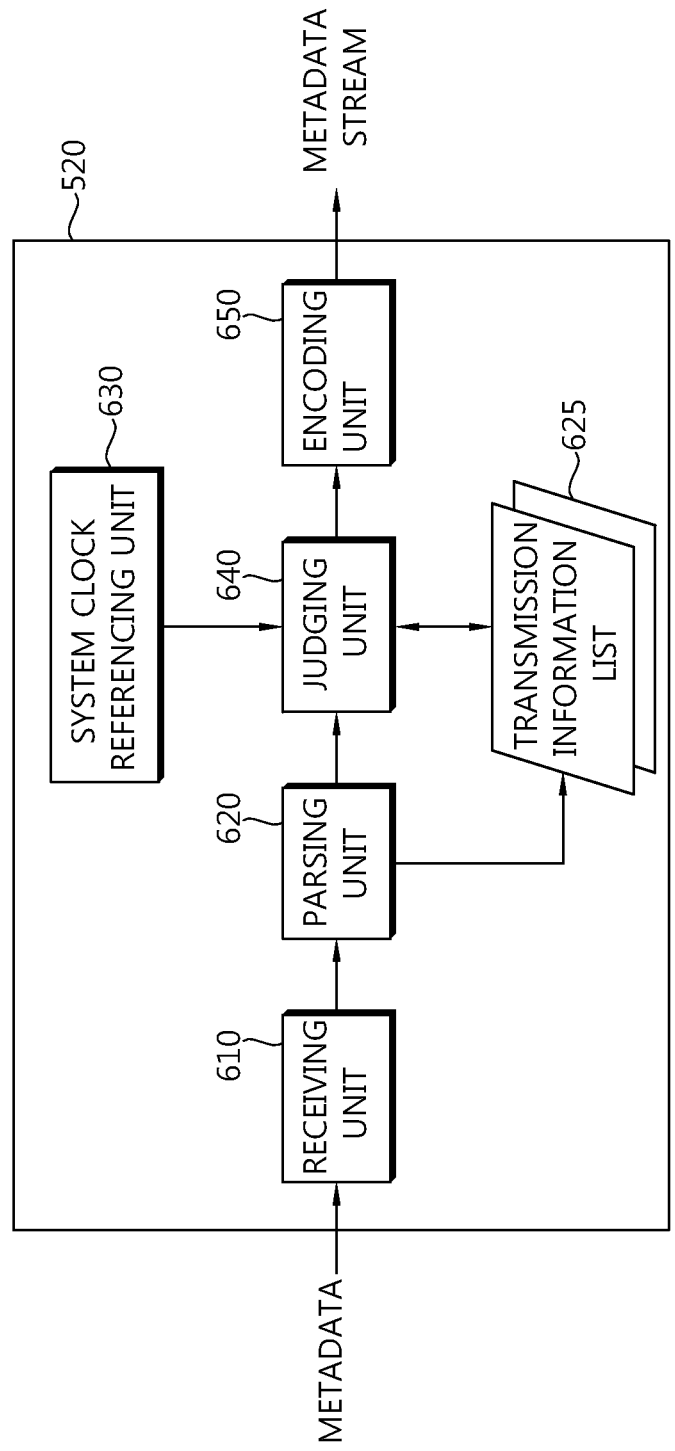
FIG. 6 is a detailed block diagram showing a metadata streamer of the augmented broadcasting stream transmission device according to the exemplary embodiment of the present invention in detail.

FIG. 6 is a detailed block diagram showing a metadata streamer 520 of the augmented broadcasting stream transmission device according to the exemplary embodiment of the present invention in detail. As shown in FIG. 6, the metadata streamer 520 according to the exemplary embodiment of the present invention may include a receiving unit 610, a parsing unit 620, a system clock referencing unit 630, a judging unit 640, and an encoding unit 650.

Referring to FIG. 6, the receiving unit 610 receives the metadata generated in the augmented broadcasting authoring server 510. The received metadata are transmitted to the parsing unit 620.

The parsing unit 620 parses the metadata received in the receiving unit 610 to fragment the metadata in an individual transmission unit and configures a metadata transmission information list 625 through a presentation time, a network arriving time, and a traffic transfer time of a corresponding image frame.

The system clock referencing unit 630 synchronizes a system time of the streamer 520 with an image stream generating unit (not shown) with reference to system clock information as soon as image information is transmitted for augmented broadcasting service transmission. That is, since the synchronization between the image and the metadata is an important issue, the system clock referencing unit 630 allows reference times of the image stream generating unit and the streamer 520 to coincide with each other based on the system clock.

The judging unit 640 monitors the system clock synchronized through the system clock referencing unit 630 and searches the transmission information list 625 for each time section. Then, the judging unit 640 compares a sending time field included in the transmission information list 625 with the system clock to judge a transmission range, that is, whether a sending time is before a current time based on the current time. As a result of the judgment, metadata corresponding to the transmission range are extracted and transmitted to the encoding unit 650.

The encoding unit 650 encodes the metadata judged to correspond to the transmission range through the judging unit 640 to generate a metadata stream and transmits the metadata stream to the re-multiplexing unit (not shown).

The re-multiplexing unit (not shown) multiplexes the received metadata stream according to broadcasting program scheduling and transmits the multiplexed metadata stream through the broadcasting network.

Augmented Broadcasting Stream Transmission Method

Figure 7:
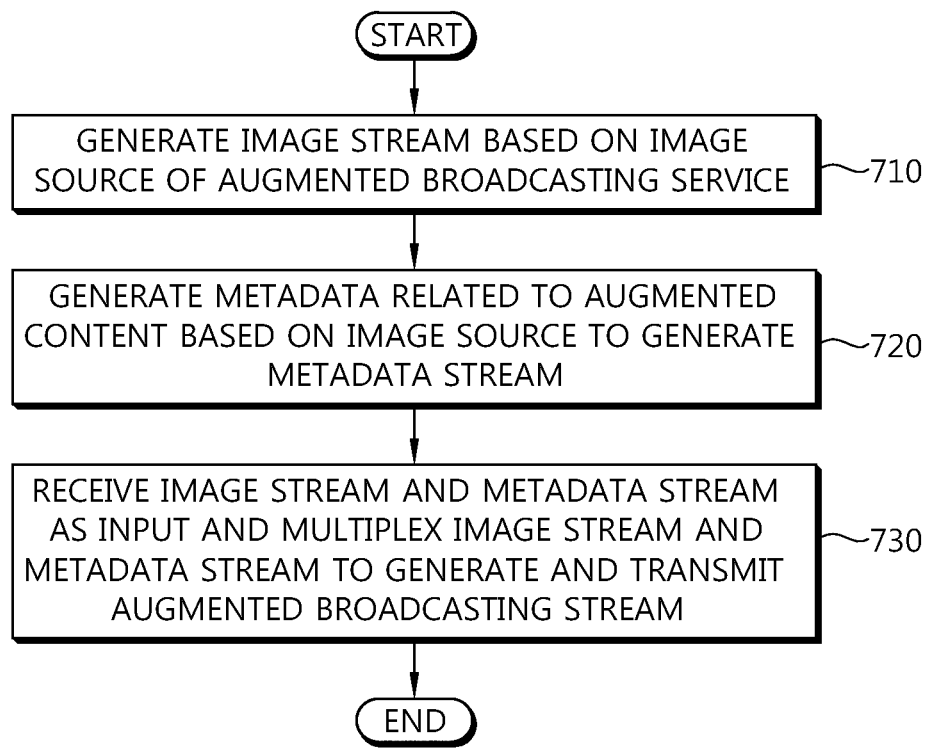
FIG. 7 is a flow chart schematically showing an augmented broadcasting stream transmission method according to the exemplary embodiment of the present invention.

FIG. 7 is a flow chart schematically showing an augmented broadcasting stream transmission method according to the exemplary embodiment of the present invention. As shown in FIG. 7, the augmented broadcasting stream transmission method according to the exemplary embodiment of the present invention may include an image stream generating step 710, a metadata stream generating unit 720, and a re-multiplexing step 730.

Referring to FIG. 7, in the image stream generating step 710, the image stream generating unit (not shown) generates an image stream based on an image source of an augmented broadcasting service. Here, the image stream generating unit encodes the image source input from an AV player or a camera into MPEG-2 TS through a device having the same configuration as that of an MPEG-2 TS encoder according to the related art to generate and transmit the image stream. The transmitted image stream is multiplexed with the metadata stream and the PSIP data in the re-multiplexing step 730.

In the metadata stream generating step 720, the metadata stream generating unit (not shown) generates metadata related to an augmented content of an augmented broadcasting service based on the image source to generate a metadata stream. Here, a sending time in which metadata n corresponding to a specific image frame k of the image source are transmitted is calculated based on a presentation time t in which the specific image frame k is transmitted and the metadata stream is generated so that the metadata n are transmitted in the sending time. Here, the sending time may be calculated based on the presentation time t, a broadcasting arriving time required to transfer the image frame k to the receive terminal through the broadcasting network, a network arriving time required to secure an augmented content in the receiving terminal through the communication network, and a traffic transfer time according to a type of augmented content.

According to the exemplary embodiment of the present invention, the sending time may be calculated by subtracting the sum of the broadcasting arriving time, the network arriving time, and the traffic transfer time from the presentation time t.

Next, in the re-multiplexing step 730, the re-multiplexing unit (not shown) receives the image stream generated in the image stream generating step 710 and the metadata stream generated in the metadata stream step 720 as inputs, multiplexes the image stream and the metadata stream to generate an augmented broadcasting stream, and transmits the generated augmented broadcasting stream to the receive terminal through the broadcasting network.

According to another exemplary embodiment of the present invention, the augmented broadcasting stream transmission method may further include a step of transmitting signaling information for the augmented broadcasting service through the PSIP server (not shown). Further, in the re-multiplexing step 730, the re-multiplexing unit receives the image stream, the metadata stream, and the signaling information as inputs, multiplexes the image stream, the metadata stream, and the signaling information to generate an augmented broadcasting stream, and transmits the generated augmented broadcasting stream to the receive terminal.

Figure 8:
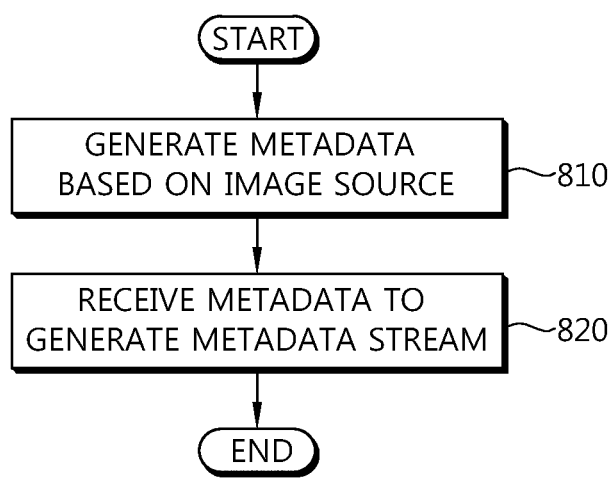
FIG. 8 is a detailed flow chart showing a metadata stream generating step in the augmented broadcasting stream transmission method according to the exemplary embodiment of the present invention in detail.

FIG. 8 is a detailed flow chart showing a metadata stream generating step 720 in the augmented broadcasting stream transmission method according to the exemplary embodiment of the present invention in detail. As shown in FIG. 8, the metadata stream generating step 720 according to the exemplary embodiment of the present invention may include a metadata generating step 810 and a stream generating step 820.

In the metadata generating unit 810, the augmented broadcasting authoring server (not shown) generates the metadata based on the image source. The augmented broadcasting authoring server (not shown) may receive the image source as an input and edit information on an area at which an augmented content for an augmented broadcasting service is put in an individual image frame section and an attribute of the augmented content to generate the metadata.

In the stream generating step 820, the metadata streamer (not shown) receives the metadata generated in the metadata generating step 810 to generate the metadata stream. The stream generating step 820 will be described below in more detail with reference to FIG. 9.

Figure 9:
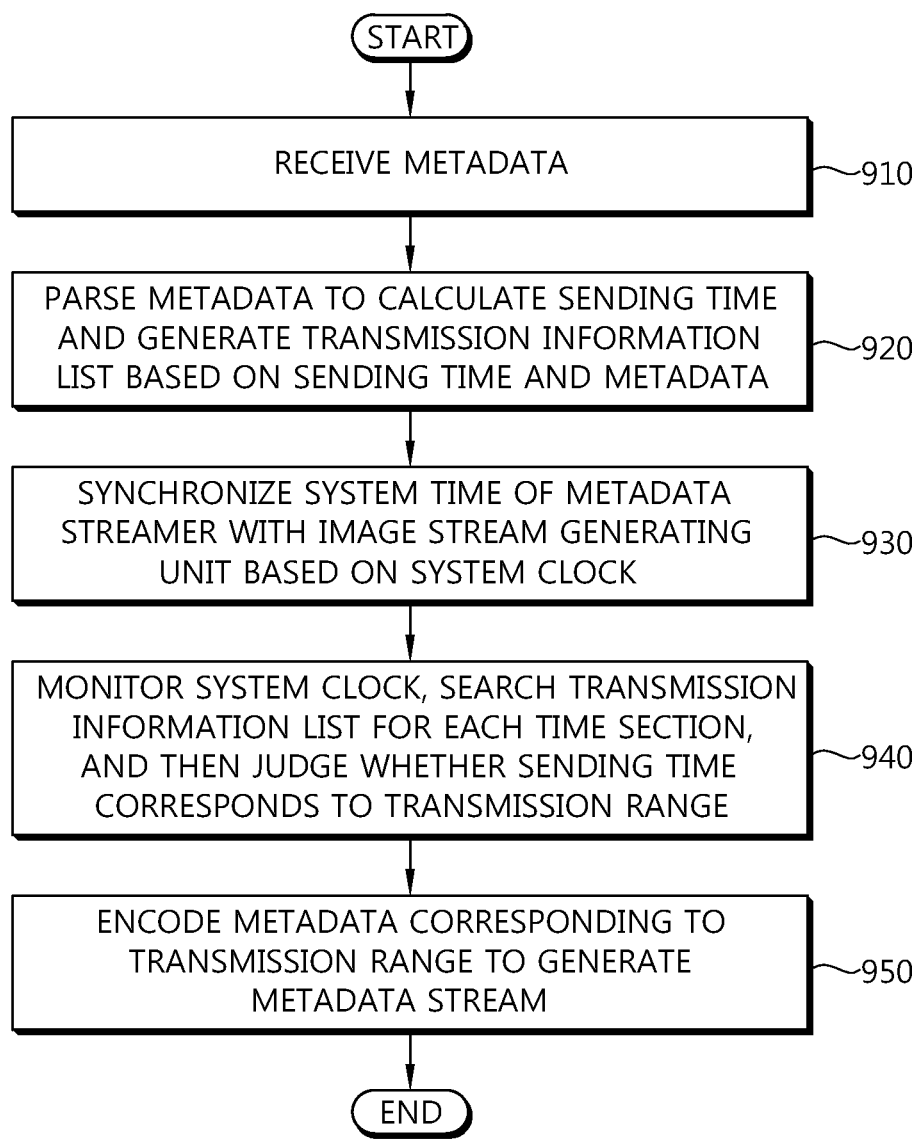
FIG. 9 is a detailed flow chart showing a stream generating step in the augmented broadcasting stream transmission method according to the exemplary embodiment of the present invention in detail.

FIG. 9 is a detailed flow chart showing a stream generating step 820 in the augmented broadcasting stream transmission method according to the exemplary embodiment of the present invention in detail. As shown in FIG. 9, the stream generating step 820 according to the exemplary embodiment of the present invention may include a receiving step 910, a parsing step 920, a system clock referencing step 930, a judging step 940, and an encoding step 950.

Referring to FIG. 9, in the receiving step 910, the metadata streamer (not shown) receives the augmented broadcasting metadata generated in the augmented broadcasting authoring server (not shown).

In the parsing step 920, the metadata streamer (not shown) parses the metadata received in the receiving step 920 to calculate the sending time. In addition, the metadata streamer generates the transmission information list based on the sending time and the metadata. As described above, the transmission information list includes a sending time field calculated through the presentation time, the broadcasting arriving time, the network arriving time, and the traffic transfer time of the image frame and an identification value of the metadata and has information tabled therein so that corresponding metadata may be transmitted through comparison of sending times.

In the system clock referencing step 930, the metadata streamer (not shown) synchronizes a system time thereof with the image stream generating unit (not shown) based on a system clock meaning a reference time for determining an image output time of the image source and the sending time of the metadata of the metadata streamer (not shown).

Then, in the judging step 940, the metadata streamer (not shown) monitors the system clock and searches the transmission information list for each time section. In addition, the metadata streamer judges whether the sending time included in the transmission information list corresponds to the transmission range.

In the encoding step 950, the metadata streamer (not shown) encodes the metadata judged to correspond to the transmission range in the judging step 940 to generate the metadata stream and transmits the generated metadata stream to the re-multiplexing unit (not shown).

Augmented Broadcasting Service Providing Device

Figure 10:
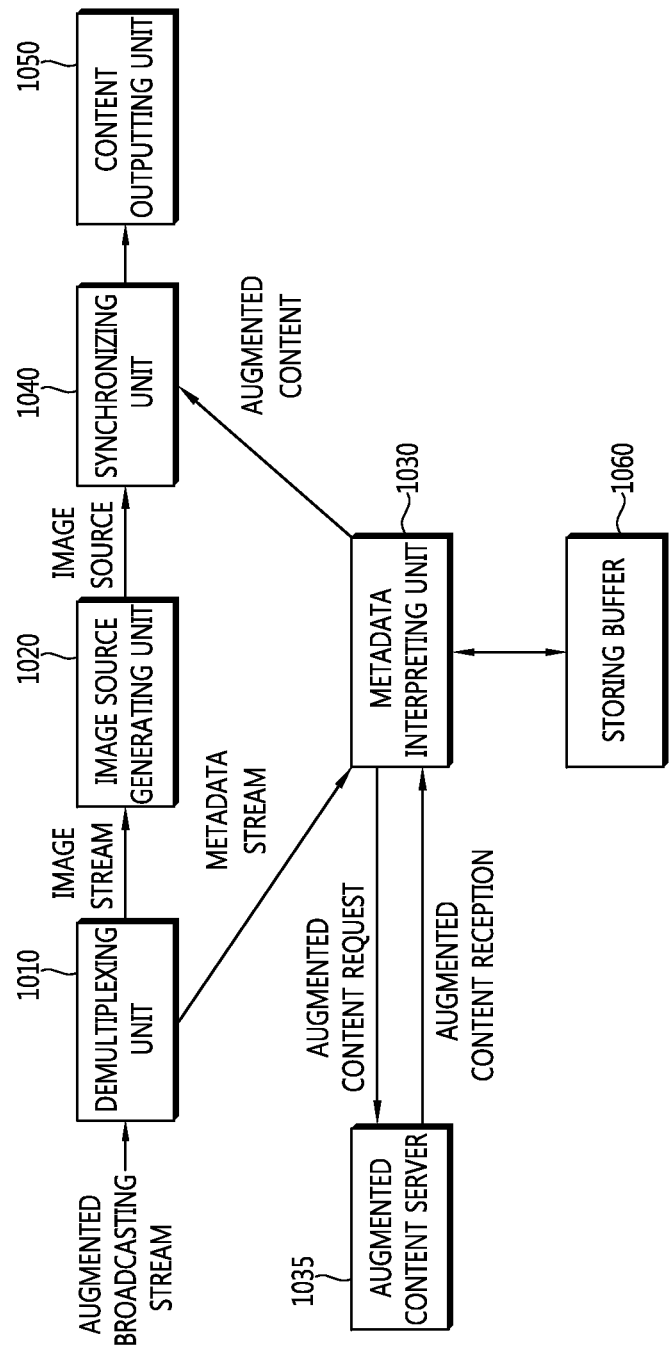
FIG. 10 is a block diagram schematically showing an augmented broadcasting service providing device according to another exemplary embodiment of the present invention.

FIG. 10 is a block diagram schematically showing an augmented broadcasting service providing device according to another exemplary embodiment of the present invention. The augmented broadcasting service providing device may be a digital TV, a digital radio, a personal computer, a laptop computer, a personal digital assistant, a smart phone, a wired and wireless terminal, or a portable terminal. As shown in FIG. 10, the augmented broadcasting service providing device according to the exemplary embodiment of the present invention may include a demultiplexing unit 1010, an image source generating unit 1020, a metadata interpreting unit 1030, a synchronizing unit 1040, a content outputting unit 1050, and a storing buffer 1060.

Referring to FIG. 10, the demultiplexing unit 1010 first receives the augmented broadcasting stream through the broadcasting network. Here, the received augmented broadcasting stream may be generated by calculating the sending time in which the metadata n corresponding to the image frame k of the image source are transmitted based on the presentation time t in which the image frame k is transmitted and multiplexing an image frame k' of the sending time and the metadata n with each other. Therefore, the metadata may be multiplexed and received in a time more rapid as compared to the corresponding image frame by a predetermined time. The metadata may include information (for example, the sending time, the presentation time, or the like) related to the sending time.

The sending time of the metadata may be vary important in order to synchronize between the related augmented content according to the interpretation of the metadata and the image source, which may be calculated by the method as described above. That is, the sending time may be calculated based on the presentation time t of the corresponding image frame, the broadcasting arriving time required to receive the image frame through the broadcasting network, the network arriving time required to secure the augmented content of the augmented broadcasting service through the communication network, and the traffic transfer time according to a type of augmented content. The metadata transmitted in a time more rapid as compared to the corresponding image frame by the time difference (See FIG. 2) according to the sending time and arriving the receive terminal may be interpreted in the metadata interpreting unit, and the related augmented content may be requested, received, and synchronized with the image source to thereby be output.

The demultiplexing unit 1010 demultiplexes the received augmented broadcasting stream to generate the image stream and the metadata stream. The image stream is transmitted to the image source generating unit 1020 and then decoded in the image source generating unit 1020, and the metadata stream is transmitted to the metadata interpreting unit 1030.

The image source generating unit 1020 decodes the image stream generated in the demultiplexing unit 1010 to generate the image source. The image source includes an audio and a video. The audio and the video may be individually or together decoded according to a scheme in which they are encoded.

The metadata interpreting unit 1030 may interpret the metadata stream demultiplexed in the demultiplexing unit 1010 and request an augmented content server 1035 for an augmented content according to the interpretation to receive the augmented content. The metadata is interpreted by applying a decoding scheme appropriate for a scheme of encoding the metadata in a receiving side based on the scheme of encoding the metadata in a transmit side. Since the metadata includes various information (for example, information on a presentation position, an attribute, and the like) of the augmented content, a required augmented content is requested to the augmented content server 1035 through the communication network according to the interpretation of the metadata and a result thereof is received. The metadata interpreting unit 1030 may require a predetermined time may until the image source is received since the metadata may arrive at the receive terminal in a more rapid time by a predetermined time as described above in synchronizing the requested augmented content and the image source with each other. Therefore, the metadata interpreting unit 1030 may store the received metadata or the received augmented content in the storing buffer 1060.

Since a predetermined time may be required until the image frame corresponding to the metadata is received for synchronization with the image source, the storing buffer 1060 may store the metadata or the augmented content according to the interpretation of the metadata for a predetermined time.

The synchronization unit 1040 receives the image source decoded in the image source generating unit 1020 and the additional augmented content received by the request of the metadata interpreting unit 1030 to perform synchronization. The synchronizing unit 1040 accurately synchronizes the corresponding image frame k and the augmented content according to the interpretation of the metadata n corresponding to the corresponding image frame k with each other using the presentation time t of the sending time related information included in the metadata. That is, the image source and the augmented content are synchronized with each other based on the presentation time of each image frame of the image source. Here, in order to easily perform the media synchronization, according to the exemplary embodiment of the present invention, the augmented content buffered through the storing buffer 1060 may be used.

The content outputting unit 1050 outputs the content synchronized in the synchronizing unit 1040. The content may be visually output in a display form. In addition, the content may be output in a sound form through a speaker, or the like. The augmented content may be added to the audio or the video according to a format thereof and then output. Alternatively, the augmented content may be output in other media forms.

Augmented Broadcasting Service Providing Method

Figure 11:
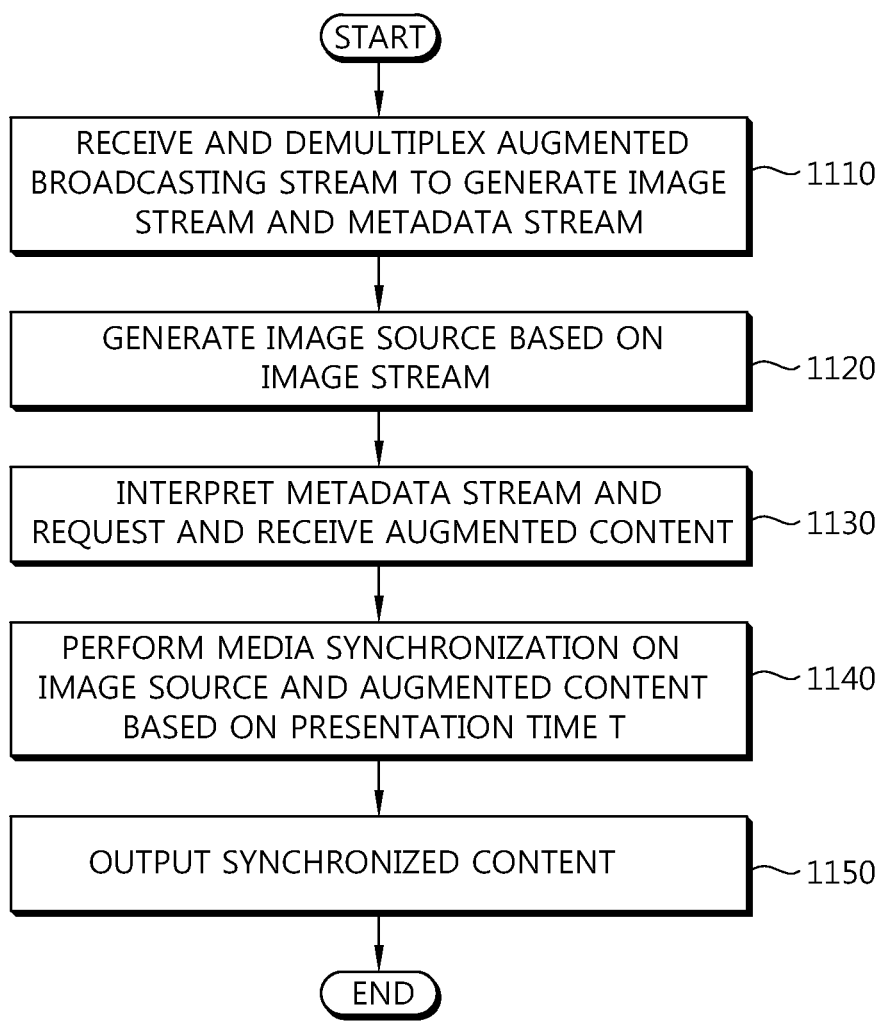
FIG. 11 is a flow chart schematically showing an augmented broadcasting service providing method according to another exemplary embodiment of the present invention.

FIG. 11 is a flow chart schematically showing an augmented broadcasting service providing method according to another exemplary embodiment of the present invention. As shown in FIG. 11, the augmented broadcasting service providing method according to the exemplary embodiment of the present invention may include a demultiplexing step 1110, an image source generating step 1120, a metadata interpreting step 1130, a media synchronizing step 1140, and a content outputting step 1150.

Referring to FIG. 11, in the demultiplexing step 1110, the augmented broadcasting service providing device (not shown) first receives the augmented broadcasting stream through the broadcasting network. Here, the received augmented broadcasting stream may be generated by calculating the sending time in which the metadata n corresponding to the image frame k of the image source are transmitted based on the presentation time t in which the image frame k is transmitted and multiplexing an image frame k' of the sending time and the metadata with each other. Therefore, the metadata may be multiplexed and received in a time more rapid as compared to the corresponding image frame by a predetermined time. The metadata may include information (for example, the sending time, the presentation time, or the like) related to the sending time.

The sending time of the metadata may be calculated based on the presentation time t of the corresponding image frame, the broadcasting arriving time required to receive the image frame through the broadcasting network, the network arriving time required to secure the augmented content of the augmented broadcasting service through the communication network, and the traffic transfer time according to a type of augmented content. The metadata transmitted in a time more rapid as compared to the corresponding image frame by the time difference (See FIG. 2) according to the sending time and arriving the receive terminal may be interpreted in the metadata interpreting unit, and the related augmented content may be requested, received, and synchronized with the image source to thereby be output.

In the demultiplexing step 1110, the augmented broadcasting service providing device (not shown) demultiplexes the received augmented broadcasting stream to generate the image stream and the metadata stream. The image stream is decoded in the image source generating step 1120, and the metadata stream is interpreted in the metadata interpreting step 1130.

In the image source generating step 1120, the augmented broadcasting service providing device (not shown) decodes the image stream generated in the demultiplexing step 1110 to generate the image source. The image source includes an audio and a video. The audio and the video may be individually or together decoded according to a scheme in which they are encoded.

In the metadata interpreting step 1130, the augmented broadcasting service providing device (not shown) may interpret the metadata stream demultiplexed in the demultiplexing step 1110 and request the augmented content server (not shown) for the augmented content according to the interpretation to receive the augmented content. The metadata is interpreted by applying a decoding scheme appropriate for a scheme of encoding the metadata in a receiving side based on the scheme of encoding the metadata in a transmit side. Since the metadata includes various information on the augmented content, a required augmented content is requested to the augmented content server through the communication network according to the interpretation of the metadata and a result thereof is received.

In the metadata interpreting step 1130, the augmented broadcasting service providing device (not shown) may require a predetermined time may until the image source is received since the metadata may arrive at the receive terminal in a more rapid time by a predetermined time as described above in synchronizing the requested augmented content and the image source with each other.

Therefore, the storing buffer (not shown) storing the received metadata or the received augmented content therein may be provided. Since a predetermined time may be required until the image frame corresponding to the metadata is received for synchronization with the image source, the storing buffer (not shown) may store the metadata or the augmented content according to the interpretation of the metadata for a predetermined time.

In the synchronizing step 1140, the augmented broadcasting service providing device (not shown) receives the image source decoded in the image source generating step 1120 and the additional augmented content received by the request in the metadata interpreting step 1130 to perform the synchronization. The synchronizing unit 1040 accurately synchronizes the corresponding image frame k and the augmented content according to the interpretation of the metadata n corresponding to the corresponding image frame k with each other in the presentation time t included in the metadata. That is, the image source and the augmented content are synchronized with each other based on the presentation time of each image frame of the image source. Here, in order to easily perform the media synchronization, according to the exemplary embodiment of the present invention, the augmented content buffered through the storing buffer (not shown) may be used.

In the content outputting step 1150, the augmented broadcasting service providing device (not shown) outputs the content synchronized in the synchronizing step 1140. The content may be visually output in a display form. In addition, the content may be output in a sound form through a speaker, or the like. The augmented content may be added to the audio or the video according to a format thereof and then output. Alternatively, the augmented content may be output in other media forms.

As set forth above, with the augmented broadcasting stream transmission device and method, and the augmented broadcasting service providing device and method according to the exemplary embodiments of the present invention, the sending time of the augmented broadcasting metadata is calculated in consideration of a minimum processing time required to perform the video frame synchronization of the augmented content using matching and synthesizing information of the augmented content in the metadata through extraction and interpretation of the metadata stream, thereby making it possible to implement accurate synchronization between the image source and the augmented content in the real time or non-real time augmented broadcasting service providing environment.

In addition, with the augmented broadcasting stream transmission device and method, and the augmented broadcasting service providing device and method according to the exemplary embodiments of the present invention, a data transfer scheme is provided in consideration of unique characteristics of the augmented broadcasting service, thereby making it possible to provide a broadcasting service distinguished from an existing data broadcasting service.

Hereinabove, although the present invention have been described with reference to the accompanying drawing and the exemplary embodiments thereof, those skilled in the art will appreciate that the scope of the present invention is not limited to the accompanying drawing and the exemplary embodiments of the present invention, but various modifications, additions and substitutions are possible without departing from the scope and spirit of the invention as disclosed in the accompanying claims.

What is claimed is:

1. An augmented broadcasting stream transmission device of generating an augmented broadcasting stream to transmit the augmented broadcasting stream to a receiving side in order to provide an augmented broadcasting service, the augmented broadcasting stream transmission device comprising:
    an image stream generating unit generating an image stream based on an image source of the augmented broadcasting service;

a metadata stream generating unit generating metadata related to an augmented content of the augmented broadcasting service based on the image source to generate a metadata stream; and a re-multiplexing unit receiving the image stream and the metadata stream as inputs and multiplexing the image stream and the metadata stream to generate and transmit the augmented broadcasting stream, wherein the metadata stream generating unit calculates a sending time s in which metadata n corresponding to an image frame k of the image source are transmitted based on a presentation time t in which the image frame k is transmitted and generates the metadata stream so that the metadata n are transmitted in the sending time s;

wherein the sending time s is calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content; and wherein the sending time s is a value obtained by subtracting the sum of the broadcasting arriving time, the network arriving time, and the traffic transfer time from the presentation time t.

2. The augmented broadcasting stream transmission device of claim 1, wherein the metadata stream generating unit generates a metadata transmission information list based on the calculated sending time and the metadata, and the metadata stream includes the metadata transmission information list.

3. The augmented broadcasting stream transmission device of claim 1, wherein the metadata stream generating unit includes:

an augmented broadcasting authoring server generating the metadata based on the image source; and a metadata streamer receiving the metadata to generate the metadata stream.

4. The augmented broadcasting stream transmission device of claim 3, wherein the augmented broadcasting authoring server receives the image source as an input and edits information on an area at which the augmented content for the augmented broadcasting content service is put in an individual image frame section and an attribute of the augmented content to generate the metadata.

5. The augmented broadcasting stream transmission device of claim 3, wherein the metadata streamer includes:

a receiving unit receiving the metadata from the augmented broadcasting authoring server;

a parsing unit parsing the metadata to calculate the sending time and generating a metadata transmission information list based on the sending time and the metadata;

a system clock referencing unit synchronizing a system time of the metadata streamer with the image stream generating unit based on a system clock meaning a reference time for determining an image output time of the image source and the sending time of the metadata of the metadata streamer;

a judging unit monitoring the system clock and searching the transmission information list for each time section and then judging whether the sending time corresponds to a transmission range; and an encoding unit encoding metadata corresponding to the transmission range to generate the metadata stream.

6. The augmented broadcasting stream transmission device of claim 1, further comprising a program service information protocol (PSIP) server transmitting signaling information for the augmented broadcasting service, wherein the re-multiplexing unit receives the image stream, the metadata stream, and the signaling information as inputs and multiplexes the image stream, the metadata stream, and the signaling information.

7. An augmented broadcasting stream transmission method of generating an augmented broadcasting stream to transmit the augmented broadcasting stream to a receiving side in order to provide an augmented broadcasting service, the augmented broadcasting stream transmission method comprising:

an image stream generating step of generating an image stream based on an image source of the augmented broadcasting service;

a metadata stream generating step of generating metadata related to an augmented content of the augmented broadcasting service based on the image source to generate a metadata stream; and a re-multiplexing step of receiving the image stream and the metadata stream as inputs and multiplexing the image stream and the metadata stream to generate and transmit the augmented broadcasting stream, wherein the metadata stream generating step includes a step of calculating a sending time in which metadata n corresponding to an image frame k of the image source are transmitted based on a presentation time t in which the image frame k is transmitted and generating the metadata stream so that the metadata n are transmitted in the sending time;

wherein the sending time is calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content; and wherein the sending time is a value obtained by subtracting the sum of the broadcasting arriving time, the network arriving time, and the traffic transfer time from the presentation time t.

8. The augmented broadcasting stream transmission method of claim 7, wherein the metadata stream generating step includes a step of generating a metadata transmission information list based on the calculated sending time and the metadata, and the metadata stream includes the metadata transmission information list.

9. The augmented broadcasting stream transmission method of claim 7, wherein the metadata stream generating step includes:

a metadata generating step of generating the metadata based on the image source; and a stream generating step of receiving the metadata to generate the metadata stream.

10. The augmented broadcasting stream transmission method of claim 9, wherein the metadata generating step includes a step of receiving the image source as an input and editing information on an area at which the augmented content for the augmented broadcasting content service is put in an individual image frame section and an attribute of the augmented content to generate the metadata.

11. The augmented broadcasting stream transmission method of claim 9, wherein the stream generating step includes:

a step of receiving the metadata;

a step of parsing the metadata to calculate the sending time and generating a metadata transmission information list based on the sending time and the metadata;

a system clock referencing step of synchronizing a system time of a metadata streamer with an image stream generating unit based on a system clock meaning a reference time for determining an image output time of the image source and the sending time of the metadata of the metadata streamer;

a judging step of monitoring the system clock and searching the transmission information list for each time section and then judging whether the sending time corresponds to a transmission range; and an encoding step of encoding metadata corresponding to the transmission range to generate the metadata stream.

12. The augmented broadcasting stream transmission method of claim 7, further comprising a step of transmitting signaling information for the augmented broadcasting service, wherein the re-multiplexing step includes a step of receiving the image stream, the metadata stream, and the signaling information as inputs and multiplexing the image stream, the metadata stream, and the signaling information.

13. An augmented broadcasting service providing device of receiving an augmented broadcasting stream to provide an augmented broadcasting service, the augmented broadcasting service providing device comprising:

a demultiplexing unit calculating a sending time in which metadata n corresponding to an image frame k of an image source are transmitted based on a presentation time t in which the image frame k is transmitted and receiving and demultiplexing the augmented broadcasting stream including information related to the calculated sending time to generate an image stream and a metadata stream;

an image source generating unit decoding the image stream to generate the image source;

a metadata interpreting unit interpreting the metadata stream to request and receive an augmented content;

a synchronizing unit performing media synchronization on the image source and the augmented content based on the presentation time t included in the information related to the sending time; and a content outputting unit outputting the synchronized content;

wherein the sending time is calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content; and wherein the sending time is a value obtained by subtracting the sum of the broadcasting arriving time, the network arriving time, and the traffic transfer time from the presentation time t.

14. The augmented broadcasting service providing device of claim 13, further comprising a storing buffer storing the received metadata or the received augmented content therein until the received metadata or the received augmented content are synchronized with each other.

15. An augmented broadcasting service providing method of receiving an augmented broadcasting stream to provide an augmented broadcasting service, the augmented broadcasting service providing method comprising:

a demultiplexing step of calculating a sending time in which metadata n corresponding to an image frame k of an image source are transmitted based on a presentation time t in which the image frame k is transmitted and receiving and demultiplexing the augmented broadcasting stream including information related to the calculated sending time to generate an image stream and a metadata stream;

an image source generating step of generating the image source based on the image stream;

a metadata interpreting step of interpreting the metadata stream to request and receive an augmented content;

a synchronizing step of performing media synchronization on the image source and the augmented content based on the presentation time t included in the information related to the sending time; and a content outputting step of outputting the synchronized content;

wherein the sending time is calculated based on the presentation time t, a broadcasting arriving time required to transfer the image frame k to a receiving side through a broadcasting network, a network arriving time required to secure the augmented content in the receiving side through a communication network, and a traffic transfer time according to a type of augmented content; and wherein the sending time is a value obtained by subtracting the sum of the broadcasting arriving time, the network arriving time, and the traffic transfer time from the presentation time t.

16. The augmented broadcasting service providing device of claim 15, further comprising a step of providing a storing buffer storing the received metadata or the received augmented content therein until the received metadata or the received augmented content are synchronized with each other.

* * * * *